Dec. 22, 1959    T. J. KOLESA ET AL    2,918,022
RAILWAY VEHICLE TRUCK DEVICE

Filed July 29, 1957    2 Sheets-Sheet 1

INVENTORS
THOMAS J. KOLESA
HENRY S. BIENIECKI
RICHARD L. LICH
BY
*Francis T. Burgess*
ATTORNEY Dec. 22, 1959   T. J. KOLESA ET AL   2,918,022
RAILWAY VEHICLE TRUCK DEVICE
Filed July 29, 1957   2 Sheets-Sheet 2
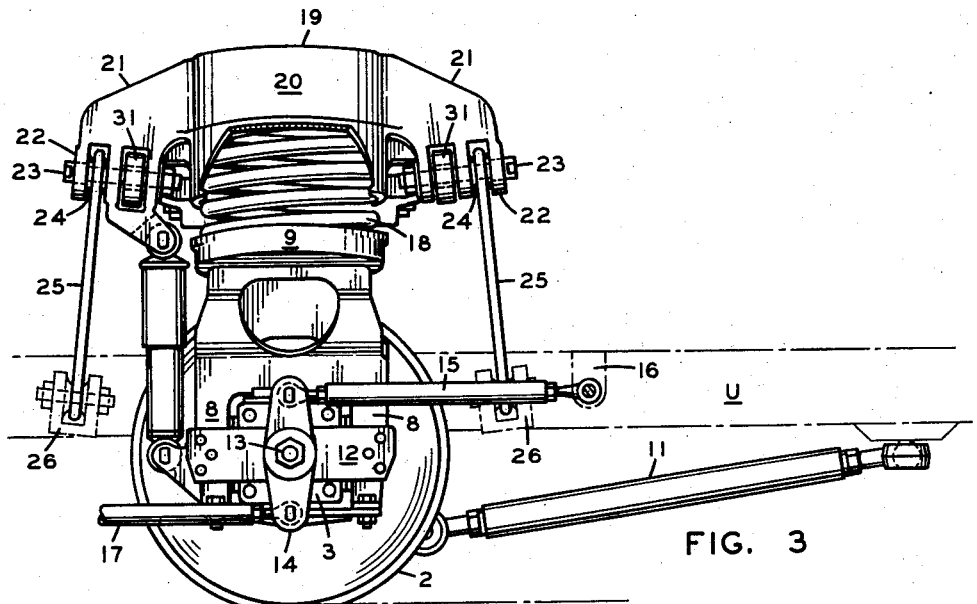
FIG. 3
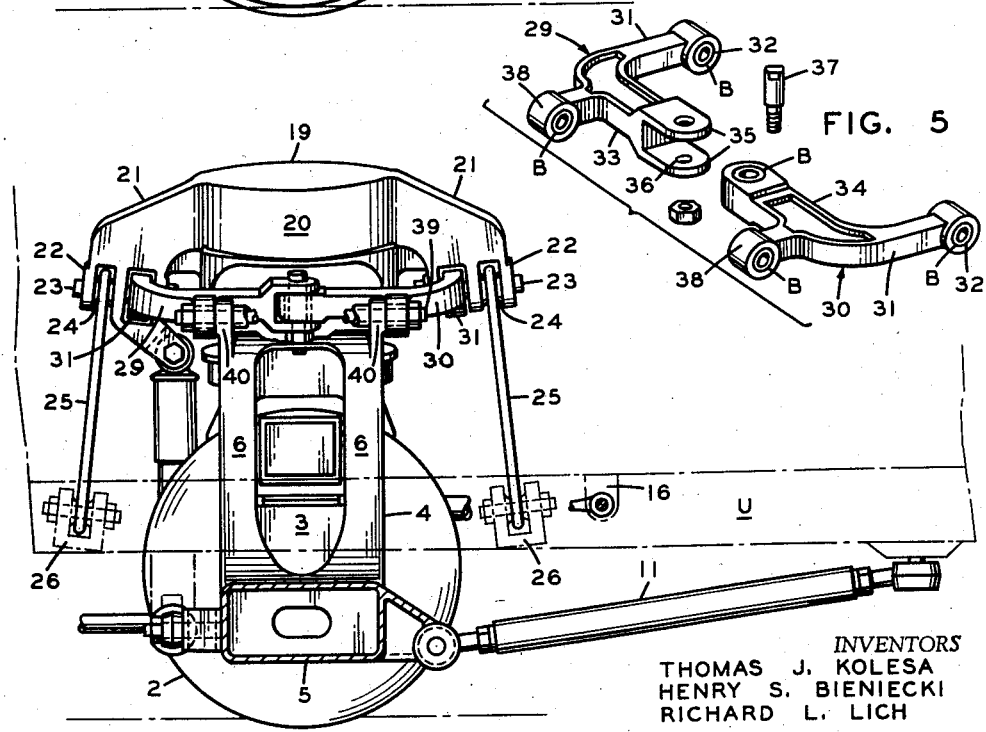
FIG. 5
FIG. 4
INVENTORS
THOMAS J. KOLESA
HENRY S. BIENIECKI
RICHARD L. LICH
BY
Francis T. Burgess
ATTORNEY

United States Patent Office 2,918,022
Patented Dec. 22, 1959

2,918,022

RAILWAY VEHICLE TRUCK DEVICE

Thomas J. Kolesa and Henry S. Bieniecki, Granite City, Ill., and Richard L. Lich, Ferguson, Mo., assignors to General Steel Castings Corporation, Granite City, Ill., a corporation of Delaware Application July 29, 1957, Serial No. 674,674

8 Claims. (Cl. 105—169)

The invention relates to railway rolling stock and consists particularly in a truck of the type in which a vehicle body is directly supported by swing hangers from separate spring-supported structure at each side of the truck.

In trucks of this type, in order to provide a stable support for the swing hangers, the spring cap must be retained against movement laterally and longitudinally relative to the truck frame, without substantially interfering with its vertical movement on the springs. It is essential, however, that some slight tilting movement about an axis extending transversely of the truck be permitted in order to accommodate swinging of the hangers longitudinally and transversely of the vehicle when the truck swivels during operation on curved track. It is evident, therefore, that any connections between the spring cap and the truck frame for restraining relative lateral and longitudinal movements therebetween, must be sufficiently flexible to permit the necessary tilting.

In previous trucks of this type, as for example, those disclosed in a co-pending application of Richard L. Lich, Serial No. 513,234, filed June 6, 1955, the spring caps are connected to the truck frame by separate substantially horizontal laterally and longitudinally extending links, which prevent substantial lateral and longitudinal movement between the spring caps and the truck frame without interfering with necessary tilting of the spring caps. The spring caps are stabilized longitudinally by supporting them on a pair of parallel springs spaced apart longitudinally of the car-body.

It is a main object of the invention to provide a novel spring cap anchor capable of offering both lateral and longitudinal restraint while, at the same time, permitting necessary tilting of the spring cap.

It is a further object of this invention to provide, in a truck of this type, improved means for stabilizing the spring cap against excessive tilting.

It is a further object to provide stability against tilting in a spring cap supported by a single spring, rather than longitudinally spaced springs shown in the prior art.

It is a still further object to provide a spring cap stabilized against tilting about an axis extending longitudinally of the truck.

We achieve these and additional objects, as will appear hereinafter, by providing a rigid truck frame with generally upwardly facing spring seats at its sides, preferably outboard of the wheels. A single spring seated on each of the spring seats supports a spring cap, which is elongated lengthwise of the truck and is provided at its ends with bearings for body-supporting depending swing hangers and for the ends of a combined longitudinal and lateral anchor device. The anchor device consists of a pair of separate, quadrant-shaped members, one end of each of which is pivotally connected to the spring cap extensions, the other ends being connected to each other. Each of the members comprising the spring cap anchor is provided with a pivot lug extending transversely of the truck, through which it is connected to the truck frame, the points of connection being spaced apart longitudinally of the truck. All pivots, including the connection between the two separate anchor members, are rubber-bushed, whereby to permit slight angling of the pivots relative to their axes. The wide spacing of the connection between the two separate anchor members laterally of the truck from the pivots makes the anchor nearly rigid in plan, so as to restrain both lateral and longitudinal movement of the spring caps. However, by virtue of the bushings in the pivots, some tilting of the separate anchor members relative to each other is permitted, whereby necessary tilting of the spring cap itself, about a transverse axis, relative to the frame is accommodated.

It is to be understood that the terms "longitudinal," "transverse," "side," and "end" relate to the longitudinal axis of the vehicle, unless otherwise specifically indicated, irrespective of the fact that the over-all dimension of the truck structure is greater transversely of the vehicle than lengthwise of the vehicle.

In the drawings:

Figure 3 is a side elevation view of the truck illustrated in Figures 1 and 2.

Figure 4 is a longitudinal vertical sectional view along the line 4—4 of Figure 2.

Figure 5 is a disassembled perspective view of the spring cap anchor device.

Figure 1:
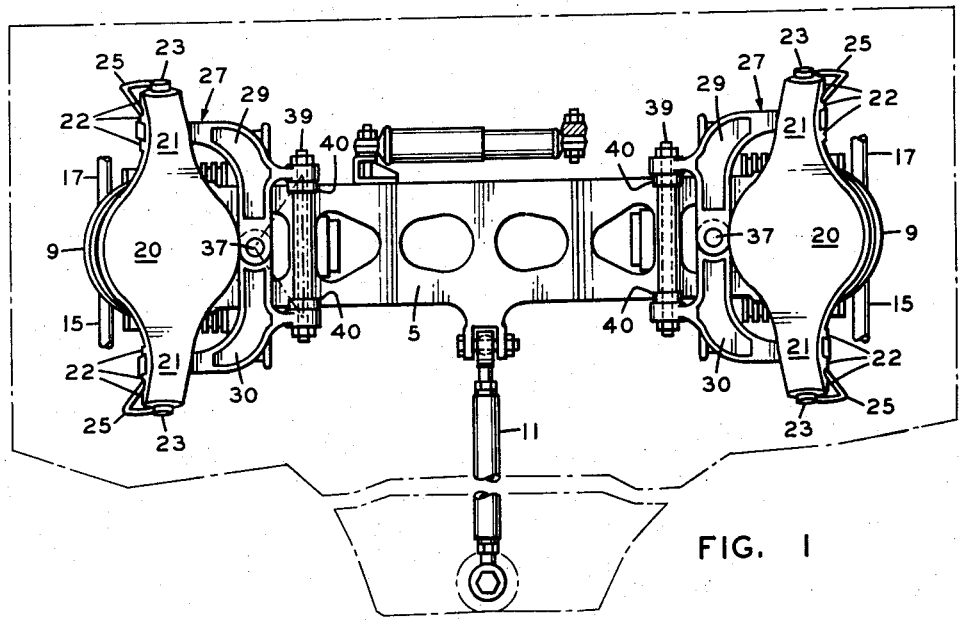
Figure 1 is a plan view of a two-wheel truck incorporating the spring cap arrangement described above.
Figure 2:
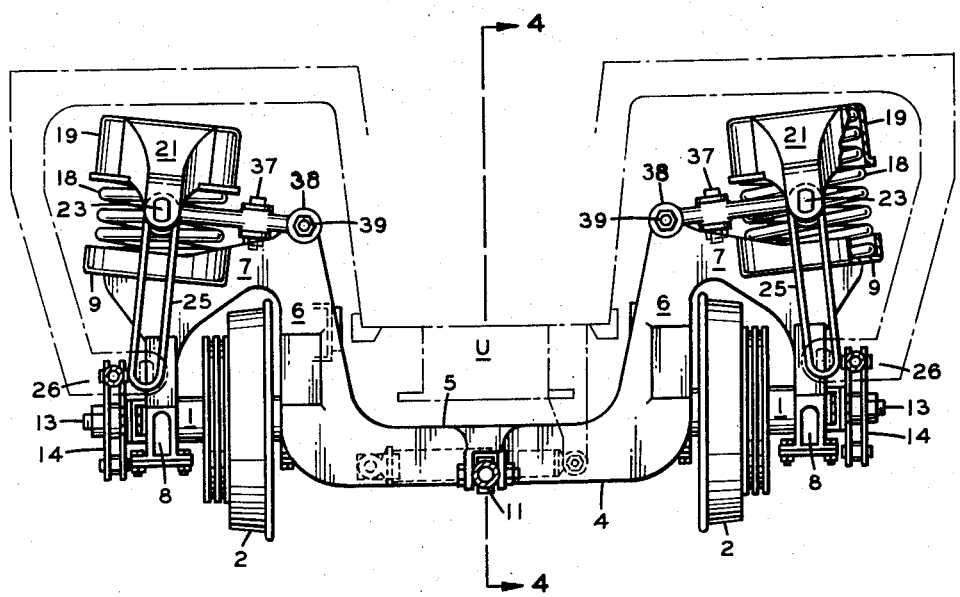
Figure 2 is an end view of the truck illustrated in Figure 1, partially sectionalized.

The truck comprises a pair of axially-aligned stub axles 1, each mounting a flanged wheel 2 and rotatably supporting journal boxes 3 at its ends. A truck frame 4, preferably of one-piece cast steel construction, includes a depressed center portion 5, upstanding legs 6 including pedestals between which are rigidly received inside journal boxes 3, and arched portions 7 extending outboard over the wheels and downwardly terminating in spaced outboard pedestals 8, between which are fixedly received outboard journal boxes 3. The arched portions 7 of the truck frame are provided with upwardly-open cup-shaped spring seats 9 which are slightly inclined inwardly and downwardly.

For the purpose of preventing longitudinal displacement of the truck frame relative to the vehicle body, while at the same time permitting relative vertical, swiveling, lateral, and transverse tilting movements therebetween, the middle of depressed center portion 5 of truck frame 4 is connected by means of a longitudinally extending link 11 to the body underframe U, link 11 normally extending along the longitudinal center line of the car body. The connections between the truck frame and link 11, and between link 11 and underframe U each consists of spherical pivots whereby to permit slight angular movement relative to the pivot axes as may be necessary to accommodate relative movement of the truck and body. Link 11 is connected to the depressed portion 5 of the truck frame at a point substantially below the axle centers.

For steering the truck and for stabilizing it against tilting about the axles, plates 12, secured to outer pedestals 8, are provided with outwardly extending pivots 13, coaxial with the axle and on pivot 13 are pivotally mounted normally vertical arms 14, which are connected at their upper ends by links 15 to brackets 16 depending from the car underframe U. At their lower ends, arms 14 are pivotally connected to longitudinally extending links 17, which may be secured at their other ends (not shown) to steering mechanism, the normal position of the links and arms 14 on straight track being as shown in Figure 3, with links 14 vertical. On curved track the steering mechanism, which forms no part of this invention, urges the links 17 at the opposite sides of the truck in opposite directions, thereby causing rotation of the truck frame about a vertical axis. The vertical spacing between the connection of link 11 to the truck frame and the pivotal connection between arm 14 and the truck frame effectively resists the tendency of the truck to tilt about its transverse axis.

A coil spring 18 is seated in each of the spring seats 9 and supports at its upper end a spring cap 19 having a cup-shaped downwardly open central portion 20, in which the upper end of spring 18 is received. Spring cap 19 is formed with brackets 21 extending in both directions longitudinally of the truck and terminating in downwardly open trifurcated clevises 22, at a lower level than the top of the cap. Bolts 23, forming the pivot axes of clevises 22, lie in the same longitudinal substantially vertical planes as the axes of springs 18 and are slightly inclined upwardly in a direction away from the spring. Between the middle and the outermost trifurcations, bolts 23 support grooved annular bearing members 24, on which are supported link-shaped body-support hangers 25. Each of the hangers 25 is inclined outwardly and downwardly from its upper point of suspension both transversely and longitudinally of the truck. The vehicle body is supported from the lower ends of hangers 25 by brackets 26, which extend inwardly from the body side framing. Springs 18 have the same inclination laterally of the truck as do hangers 25, so that downward pull of the body load on the hangers urges the spring cap downwardly in the same direction as the spring axes. It will be noted that the upper pivot bolts 23, from which hangers 25 are suspended, are at a lower level than the top of the spring cap, whereby the downward pull of the body load on the hangers tends to stabilize the spring cap againts tilting about an axis extending longitudinally of the truck.

Between the middle and inner trifurcations of clevises 22, spring cap anchors, generally indicated at 27, are pivotally secured at their outer ends by bolts 23 to the spring caps. Anchors 27 each comprise a pair of normally coplanar horizontally disposed generally quadrant-shaped members 29 and 30, the transversely extending arms 31 of which extend between the middle and inner trifurcations of the clevises and are formed at their outer ends with openings 32, through which clevis bolts 23 pass. Openings 32 include rubber bushings B whereby to accommodate slight angling of the arms 31 relative to the pivotal axes. The ends of the arms 33 and 34 extending longitudinally of the truck are formed with mating pivotal connections comprising a clevis 35 on member 33, between the jaws of which the other member 34 is pivotally received, as at 36, the two members being secured to each other by a rubber-bushed vertical bolt 37. Each of the members 29 and 30 is formed with a transversely inwardly extending lug 38 for rubber-bushed pivotal connection, by means of a bolt 39, extending longitudinally of the truck, to upstanding longitudinally spaced brackets 40 on the truck frame.

It will be evident that the anchors 27 are substantially non-deformable in the horizontal plane, because even though the pivots connecting the members 29 and 30 to the truck frame are rubber-bushed, these two connections and the connection between the separate anchor members form a horizontally rigid triangle. Thus any lateral or longitudinal forces transmitted to the spring caps by lateral or longitudinal swinging movements of the body-supporting hangers 25 will be resisted by the resistance of anchor 27 to horizontal deformation. The spring caps, however, will be free to move substantially vertically, in accordance with compression and expansion of the springs. Actually, the movement of the outer anchor connections is arcuate about the inner anchor pivots as an axis, but practically, due to the small angular value of the arc described by such movement, it can be considered purely lineal.

Anchor 27 is slightly deformable vertically, to accommodate the necessary tilting of the spring caps about transverse axes caused by unequal foreshortening of the hangers during swiveling movement of the truck. This deformation is made possible by the yieldability of the rubber bushings, and can best be understood by reference to Figure 4; assuming that the car is rounding a curve such that the left hand hanger assumes a nearly vertical position, and the right hand hanger is further inclined toward the left, since the lower ends of the hangers are retained in the same horizontal plane, the spring cap will be tilted, with its right hand end substantially lower than its left hand end. When this occurs, the left hand anchor member 29 will rotate upwardly about bolt 39, and right hand member 30 will rotate downwardly about bolt 39, both members tilting slightly in a clockwise direction about axes normal to bolt 39, the latter tilting being yieldably resisted but permitted by the rubber-bushed pivots on bolt 39. Excessive tilting of members 29 and 30 is made unnecessary by the rubber-bushed pivot 36 between members 29 and 30, since the latter pivot will accommodate some slight vertical angularity between members 29 and 30. Upon return of the hangers and spring cap to their normal tangent track position, the elasticity of the rubber bushings aids the recovery of the anchor. Thus, tilting of the spring cap is permitted but the elastic properties of the rubber bushings are utilized to yieldingly resist the vertical deformation of the anchors necessary to permit tilting of the spring cap.

It is evident that this spring cap and anchor arrangement is adaptable to multiple-axle as well as to two-wheel trucks and, accordingly, it is not contemplated that the scope of the claims should be limited to its use with two-wheel trucks. The invention may be modified in various respects as will occur to those skilled in the art and the exclusive use of all modifications as come within the scope of the appended claims is contemplated.

What is claimed is:

1. A railway vehicle truck including a truck frame part having upwardly-facing spring seats at its sides, springs supported on said seats, separate spring cap parts carried by the springs at each side of said truck frame part, and anchor devices connecting each cap part and said frame part, each said anchor device comprising a a pair of members connecting one said cap part and said frame part at points spaced apart longitudinally and being connected to each other at a point spaced transversely and longitudinally from the connections of said members to a part whereby said anchor is substantially non-deformable in the horizontal plane, thus resisting transverse and longitudinal movements of the associated cap part relative to the frame part, all of said connections being slightly deformable transversely of their axes whereby to accommodate differences in the relative heights of the connections of said members to the associated cap part and tilting of the associated cap part about transverse axes.

2. A railway vehicle truck including a truck frame having upwardly-facing spring seats at its sides, springs supported on said seats, separate caps carried by the springs at each side of said truck frame, and an anchor device pivotally connected to a cap and said frame, the connections of said device to the connected cap and said frame being spaced apart transversely, said anchor device comprising a pair of members disposed longitudinally of the truck from each other, each of said members being connected independently to said truck frame and to the connected cap at points spaced apart longitudinally of the truck, said members also being connected to each other, said anchor device being substantially non-deformable in the horizontal plane whereby to resist relative lateral and longitudinal movements of the connected cap and said frame but being slightly deformable vertically whereby to permit tilting of the connected cap about transverse axes.

3. A railway vehicle truck according to claim 2, in which the pivot connections between said spring cap anchor members and said truck frame and said spring cap, respectively, include means for accommodating limited universal movement whereby to accommodate tilting of said members relative to each other.

4. A railway vehicle truck according to claim 3, in which said pivot connections include elastic bushings whereby to provide yieldable resistance to vertical deformation of said anchor.

5. A railway vehicle truck according to claim 3, in which the connection between said members is spaced laterally of the truck from the connections between each of said members and the truck frame, whereby the connection between said members, together with said pivotal connections of each of said members to said truck frame, forms a substantially non-deformable triangle in the horizontal plane.

6. In a railway vehicle truck according to claim 5, said anchors and said hangers being connected to said spring cap on common pivotal axes.

7. In a railway vehicle truck according to claim 6, said pivotal axes lying in a longitudinal plane coincident with the axis of said spring, and being at a level below the top of said springs.

8. In a railway vehicle, a truck frame including upwardly-facing spring seats at its sides, springs supported on said seats, separate caps carried by the springs at each side of said truck frame, separate hangers carried by each end of each of said spring caps and being inclined downwardly and outwardly from said spring caps both transversely and longitudinally of the vehicle, a vehicle body supported from the lower ends of said hangers for lateral and swiveling movements with respect to said truck frame, and anchor devices connecting said truck frame and said spring caps, each said anchor device comprising a pair of longitudinally-disposed members having end portions adjacent each other, said members being connected to each other at their adjacent end portions, each of said members being connected independently of the other said member to a spring cap and to said truck frame, respectively, at points spaced longitudinally of said truck frame and said spring cap.

References Cited in the file of this patent

UNITED STATES PATENTS

| 2,225,242 | Van Dorn et al. | Dec. 17, 1940 |
| 2,352,017 | Scharpenberg et al. | June 20, 1944 |
| 2,436,053 | Mundahl | Feb. 17, 1948 |

FOREIGN PATENTS

| 1,126,807 | France | Dec. 3, 1956 |